(12) United States Patent
Asensio et al.

(10) Patent No.: US 7,097,873 B2
(45) Date of Patent: Aug. 29, 2006

(54) METHOD AND INSTALLATION FOR CONTINUOUSLY PREPARING CASEINATE

(75) Inventors: Luis Asensio, Sorbiers (FR); Jean-Marie Bouvier, Lyons (FR); Laurent Bruyas, Pont Salomon (FR); Daniel Durand, Chambon Feugerolles (FR)

(73) Assignee: Clextral, Firminy (FR)

( * ) Notice: Subject to any disclaimer, the term of this patent is extended or adjusted under 35 U.S.C. 154(b) by 880 days.

(21) Appl. No.: 10/181,378

(22) PCT Filed: Jan. 16, 2001

(86) PCT No.: PCT/FR01/00133

§ 371 (c)(1),
(2), (4) Date: Jul. 17, 2002

(87) PCT Pub. No.: WO01/52666

PCT Pub. Date: Jul. 26, 2001

(65) Prior Publication Data

US 2003/0017247 A1    Jan. 23, 2003

(30) Foreign Application Priority Data

Jan. 18, 2000   (FR) .................................. 00 00604

(51) Int. Cl.
*A23C 9/18* (2006.01)
*A01J 21/02* (2006.01)

(52) U.S. Cl. ...................... 426/580; 426/516
(58) Field of Classification Search ................ 264/118; 426/633, 580
See application file for complete search history.

(56) References Cited

U.S. PATENT DOCUMENTS 4,839,193 A    6/1989  Mange et al.

FOREIGN PATENT DOCUMENTS

| EP | 0340396 | 11/1989 |
|---|---|---|
| FR | 2459005 | 1/1981 |
| GB | 1433842 | 4/1976 |
| GB | 2148902 | 6/1985 |

OTHER PUBLICATIONS

J. Fichtali et al., Milchwissenschaft, DE, VV GMBH Volkswirtschaftlicher Verlag. Munchen, XP000226136, vol. 46, No. 8, 1991, pp. 479-483, Pilot Plant Production of Caseins Using Extrusion Processing. II. Sodium Caseinate Production.

J. Szpendowski, Milchwissenschaft, DE, VV GMBH Volkswirtschaftlicher Verlag. Munchen, XP000454659, vol. 49, No. 5, 1994, pp. 260-263, The Effect of Extrusion on the Biological Value of Caseinates.

Jim Wagner et al., Food Engineering International, XP000957814, vol. 14, No. 2, 1989, pp. 42-45, Maing Caseinate by Extruder.

International Search Report, PCT/FR01/00133, Apr. 27, 2001, pp. 1-3.

*Primary Examiner*—Karen Cochrane Carlson
*Assistant Examiner*—Marsha Tsay
(74) *Attorney, Agent, or Firm*—Connolly Bove Lodge & Hutz LLP

(57) ABSTRACT

The invention provides a method of continuously preparing caseinate from milk proteins in non-soluble powder form in an extruder machine having two co-rotating and interpenetrating screws into which water and an alkaline reagent are introduced, and the mixture formed by the milk proteins, the water, and the alkaline reagent is subjected to a plurality of steps of kneading under pressure and of shearing with the temperature rising to obtain at the outlet from the extruder machine a caseinate paste, the caseinate paste is cooled to bring its temperature to below 20° C., a continuous thin sheet of caseinate paste is formed, and the sheet is cut up into a plurality of parallel strips, and these strips are cut up into small-sized pieces of caseinate. The invention also provides an installation for continuously preparing caseinate.

3 Claims, 5 Drawing Sheets

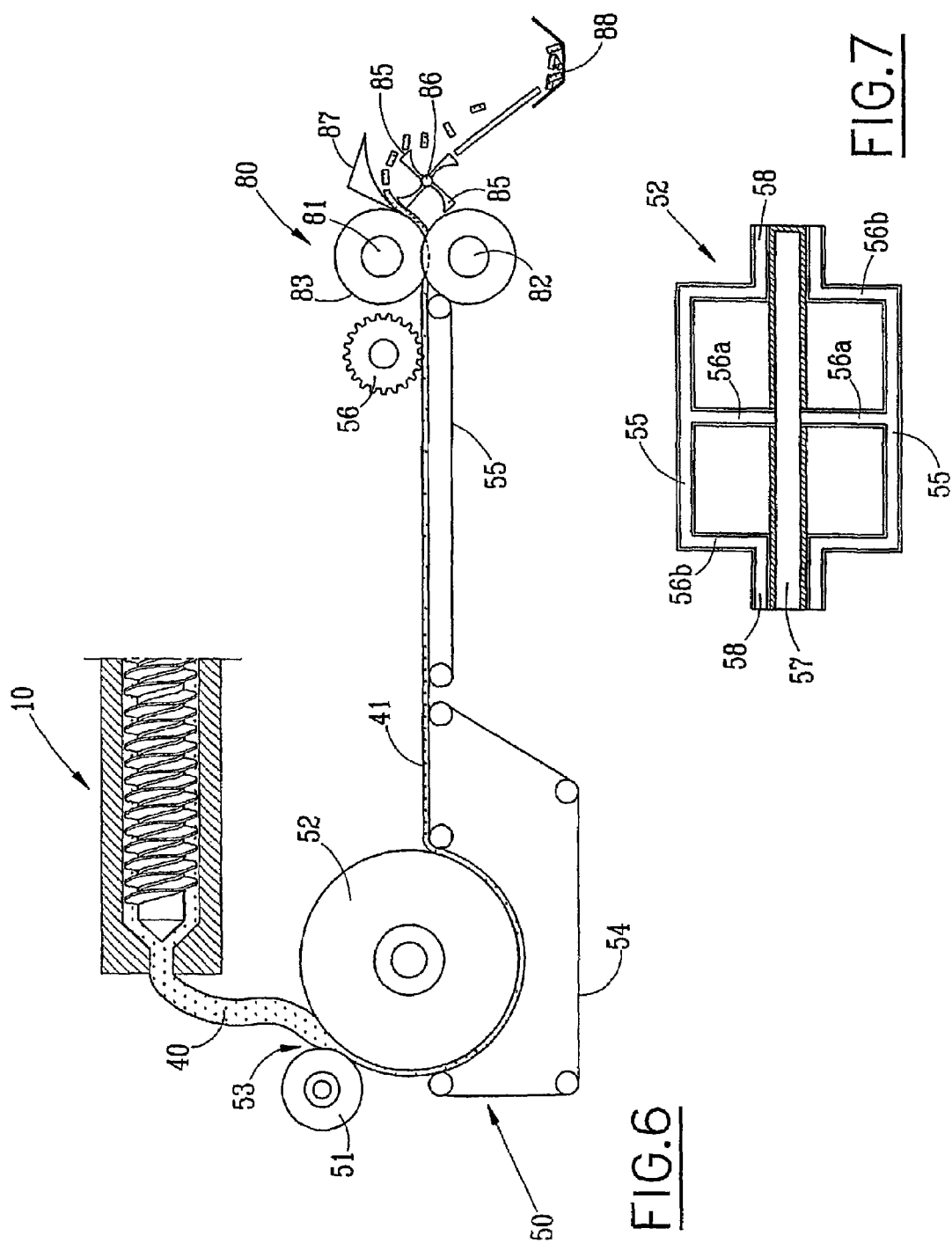

METHOD AND INSTALLATION FOR CONTINUOUSLY PREPARING CASEINATE

CROSS-REFERENCE TO RELATED APPLICATIONS

This application is filed under the provisions of 35 U.S.C. §371 based on International Application No. PCT/FR01/00133 filed Jan. 16, 2001, claiming the priority of French application 00/00604 filed Jan. 18, 2000, each of which is incorporated herein by reference.

The present invention relates to a method and to an installation for continuously preparing caseinate from casein formed by milk proteins in non-soluble powder form.

BACKGROUND OF THE INVENTION

Milk is used as raw material for fabricating various products usable in the chemical or food industries.

In particular, it is known to extract casein by precipitation, which casein is then transformed, for example into a jelling agent suitable for use in particular in making soups, desserts, ices, yogurts, or pork butchery products, or indeed for use in industries other than the food industry.

Nevertheless, in order to be usable, casein must initially be transformed into soluble caseinate.

To do this, caseinate is manufactured from casein, i.e. from milk proteins which are subjected to chemical transformation to enable them to absorb water.

Various categories of caseinate exist, including sodium caseinate and calcium caseinate. Sodium caseinate is the result of kneading casein, sodium hydroxide, and water, while calcium caseinate is the result of kneading casein, ammonium hydroxide, calcium hydroxide, and water, and possibly also ammonia.

Until now, the chemical reaction has been performed in a reactor in the presence of a large quantity of water and after several minutes caseinate is obtained which then needs to be dried in order to obtain a powder that presents poor solubility.

Installations that have been used until now for making caseinate are thus bulky and require large reactors and large dryers and such installations consume large quantities of water and of energy.

Furthermore, the installations that have been used up until now require numerous handling operations between various workstations.

OBJECTS AND SUMMARY OF THE INVENTION

An object of the invention is to propose a method and an installation for continuously preparing caseinate without interruption in the manufacturing line and making it possible to obtain caseinate that presents excellent solubility and a high degree of chemical neutrality, while simultaneously reducing energy consumption and the various handling operations needed in order to obtain this type of product.

The invention thus provides a method of continuously preparing caseinate, the method comprising the following steps:

milk proteins in non-soluble powder form are introduced continuously into an extruder machine having two co-rotating and interpenetrating screws rotated about parallel axes inside a sheath of elongate shape;

a first transport step is performed in the sheath of the extruder machine in which the milk protein powder is transported with water, and an alkaline reagent is introduced into the sheath at the end of this first step;

the mixture constituted by the milk proteins, the water, and the alkaline reagent is subjected to first intense kneading under pressure with a rise in temperature to initiate the chemical reaction between the milk proteins and the alkaline reagent;

a second transport step is performed in the sheath during which the mixture is transformed while the chemical reaction continues and the temperature of the mixture rises;

the mixture is subjected to second intense kneading under pressure and to intense shear in order to finish off the chemical reaction with the temperature of the mixture rising so as to cause the mixture to melt and so as to obtain a viscous caseinate paste;

a third transport step is performed in which the caseinate paste is transported and cooled with a degassing operation being performed at the beginning of this step to reduce and adjust the temperature and the viscosity of the caseinate paste;

the caseinate paste is subjected to a final kneading and to heat exchange with said paste being cooled;

a fourth transport step is performed together with cooling heat exchange to maintain the caseinate paste at a temperature lying in the range 70° C. to 95° C.;

the caseinate paste is extruded at said temperature with a moisture content lying in the range 30% to 40% to form a continuous strand of caseinate paste at the outlet from the extruder machine;

a continuous thin sheet of caseinate paste is formed from the strand and said sheet of caseinate is simultaneously cooled to a temperature below 20° C.;

the sheet is cut longitudinally into a plurality of parallel strips; and the strips are cut up into small-sized pieces of caseinate.

The invention also provides an installation for continuously preparing caseinate, the installation comprising:

an extruder machine comprising two co-rotating and interpenetrating screws rotated about parallel axes inside a sheath of elongate shape provided with intersecting bores and defining in succession from an upstream end to a downstream end:

a zone for continuous introduction of milk proteins in non-soluble powder form into the sheath and for transporting said milk protein powder;

a zone for transporting the milk protein powder and for introducing water and an alkaline reagent into the sheath at the end of said zone;

a first zone for intense kneading under pressure of the mixture formed by the milk proteins, the water, and the alkaline reagent, with the temperature of the mixture rising to initiate the chemical reaction between the milk proteins and the alkaline reagent;

a zone for transporting the mixture, in which zone the chemical reaction continues and the temperature of the mixture rises;

a second zone for intense kneading under pressure and for intense shear, finishing off the chemical reaction with the temperature of the mixture rising so as to cause said mixture to melt and so as to obtain a viscous caseinate paste;

a zone for transporting and cooling the caseinate paste with a degassing orifice being provided through the sheath opening out into said intersecting bores at the beginning of said zone so as to reduce and adjust the temperature and the viscosity of said caseinate paste;

a third zone for kneading and heat exchange with said paste being cooled;

a zone for transport and heat exchange with cooling so as to maintain the caseinate paste at a temperature lying in the range 70° C. to 95° C.; and a die for extruding the caseinate paste at said temperature and with a moisture content lying in the range 30% to 40% to form a continuous strand of caseinate paste at the outlet from the extruder machine;

means for continuously forming a thin sheet from said strand and for cooling the caseinate paste to a temperature below 20° C.;

means for longitudinally cutting up the sheet into a plurality of parallel strips; and means for cutting said strips transversely into small-sized pieces of caseinate.

According to other characteristics of the invention:

the screws of the extruder machine present varying pitches in the transport zone;

the screws of the extruder machine are formed in the first kneading zone by three-lobe elements in the form of isosceles triangles with truncated vertices so as to cause the mixture to pass in controlled manner, the three-lobed elements of each screw being offset relative to one another and said three-lobed elements of the two screws interpenetrating between one another;

the screws of the extruder machine are formed in the second kneading zone by threads of reverse pitch whose edges are provided with openings regularly distributed about their axes, the openings in each thread being offset relative to the openings of the adjacent threads;

the screws of the extruder machine are formed in the third kneading zone by two-lobed elements of lozenge shape with truncated vertices to enable the caseinate paste to pass through in controlled manner, the two-lobed elements of each screw being offset from one another by 90°, and said two-lobed elements of the two screws interpenetrating between one another;

the means for forming the continuous sheet of caseinate paste and for cooling said paste are formed firstly by two parallel rollers, each provided with a circuit for circulating cooling fluid and leaving between them a gap through which the caseinate paste flows, and secondly by an endless transporter belt placed beneath one of the rollers and covering substantially half of the outside surface of said roller, said transporter belt and said roller leaving between them a passage through which the caseinate paste flows;

the means for cutting the sheet longitudinally into a plurality of parallel strips are formed by two parallel rollers extending perpendicularly to the travel direction of the sheet, one of the rollers having circular cutting blades that are parallel to one another; and the means for cutting the strips transversely into pieces are formed by cutting blades extending perpendicularly to the travel direction of said strips and rotated by a horizontal shaft.

BRIEF DESCRIPTION OF THE DRAWINGS

Other characteristics and advantages of the invention appear from the following description made with reference to the accompanying drawings, in which:

FIG. 6 is a diagrammatic elevation view of means for cooling and cutting the caseinate paste at the outlet from the extruder machine in the installation for continuously preparing caseinate in accordance with the invention;

FIG. 7 is a diagrammatic axial section view showing one embodiment of a cooling circuit for a roller in the cooling means.

MORE DETAILED DESCRIPTION

FIGS. 1 to 6 are diagrams showing an installation for continuously preparing caseinate from milk proteins in non-soluble powder form.

In general, this installation comprises:

an extruder machine 10 for transforming milk proteins in non-soluble powder form into a viscous caseinate paste at a temperature lying in the range 70° C. to 95° C. and possessing moisture content lying in the range 30% to 40%;

means 50 for continuously forming a sheet of caseinate paste and cooling said paste to a temperature below 20° C.; and means for cutting up the sheet into a plurality of parallel strips and then cutting up the strips into small-sized pieces of caseinate.

Figure 1:
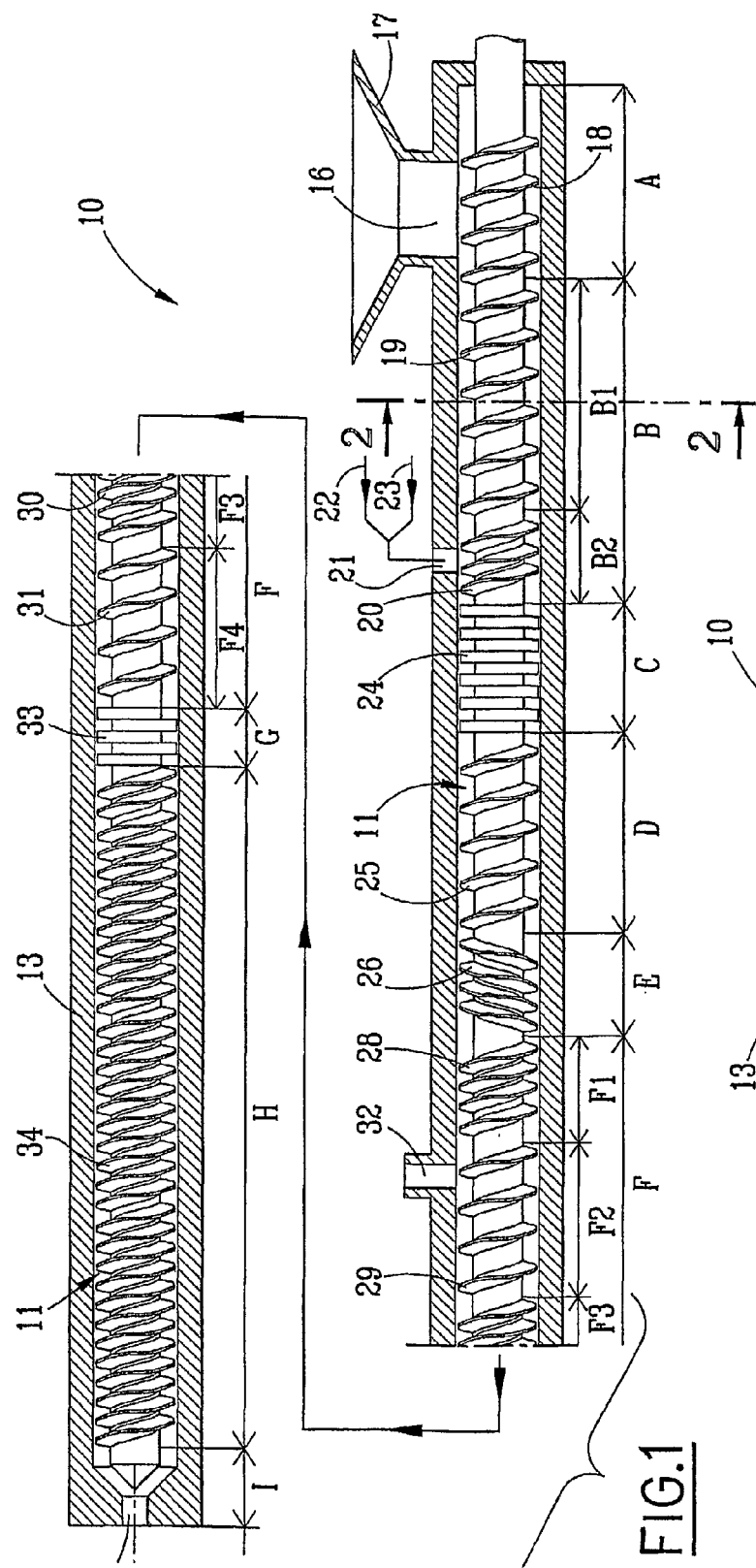
FIG. 1 is a diagrammatic section view in a vertical plane containing the axis of a screw in an extruder machine of an installation for continuously preparing caseinate in accordance with the invention.
Figure 2:
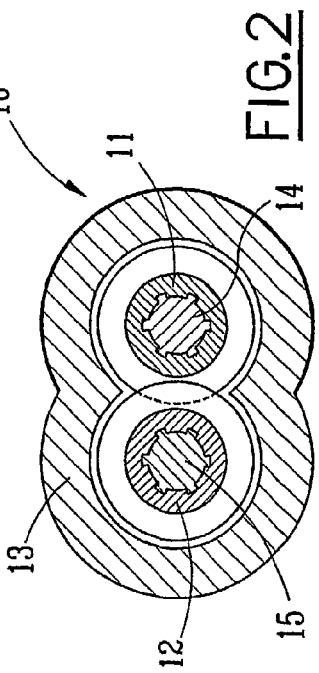
FIG. 2 is a section on line 2—2 of FIG. 1.

As shown in FIGS. 1 and 2, the extruder machine 10 is of the type having two co-rotating screws that interpenetrate, comprising two screws 11 and 12 inside an elongate enclosure forming a sheath 13 which envelops them, the screws being driven in rotation about their axes by a motor and gear box unit (not shown).

The screws 11 and 12 are provided in particular with helical threads or with elements for processing the matter introduced into the sheath 13 in a manner described below, the screws meshing one in the other while the inside wall of said sheath 13 forms two intersecting cylindrical lobes of inside diameter that is slightly greater than the outside diameter of the threads and of the processing elements.

The two screws 11 and 12 are driven with the same speed of rotation and in the same direction so that the two screws are identical, the threads and the processing elements being merely offset relative to one another.

As shown in FIG. 2, the screws 11 and 12 are advantageously constituted by fluted shafts, respectively referenced 14 and 15 having screw segments stacked thereon.

The inside bores of these screw segments are fluted in complementary manner to the shafts, while the outside portions thereof are provided with helical threads or with material-processing elements of differing pitch and configuration depending on the segment in question for the purpose of processing and transporting said material.

It is thus possible to have available quite a large number of segments of different configurations depending on the type of processing to be performed on the material.

The extruder machine 10 shown in FIG. 1 comprises a zone A for continuously introducing milk proteins in non-soluble powder form into the sheath 13 and for transporting these milk proteins downstream within said extruder machine 10.

In zone A, the sheath 13 is pierced at its end which is upstream relative to the material travel direction, by means of a feed orifice 16 surmounted by a hopper 17 into which the milk protein powder is poured continuously, e.g. as dispensed by a measuring-out device, not shown.

In the introduction zone A, the screws 11 and 12 are provided with large-pitch threads 18 in order to transport the milk protein powder introduced via the orifice 16 which is broadly open to both screws 11 and 12, and in order to distribute said powder between the screw threads.

Thus, the milk protein powder is transported towards the downstream end of the extruder machine 10 in a zone B which comprises a first segment B1 in which the screws 11 and 12 are provided with large-pitch threads 19 and a second segment B2 in which the screws 11 and 12 are provided with threads 20 at a tight pitch.

The milk protein powder is thus transported through the first segment B1 of the zone B and then through the second segment B2 where water and an alkaline reagent are injected.

To this end, the sheath 13 is pierced by an orifice 21 connected via respective ducts 22 and 23 to means for injecting water and the alkaline reagent.

The alkaline reagent is constituted by sodium hydroxide or lime and the percentage of water plus caseinate relative to the alkaline reagent lies in the range 90% to 97%.

The mixture constituted by milk proteins, water, and alkaline reagents is transported by the screws 11 and 12 through a first kneading zone C in which the mixture is subjected to intense kneading under pressure.

Figure 3:
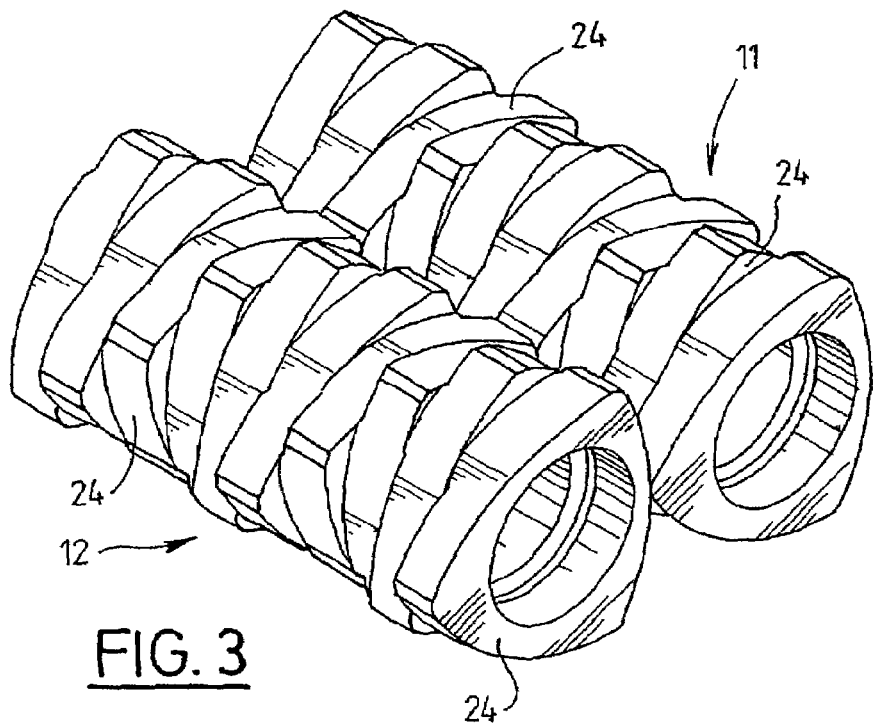
FIG. 3 is a diagrammatic perspective view of a segment of the screw of the extruder machine in the first kneading zone.

For this purpose, in the zone C the screws 11 and 12 are constituted, as shown in FIG. 3, by juxtaposed three-lobed elements 24 in the form of isosceles triangles with truncated vertices so as to cause the mixture to be passed in controlled manner towards the downstream end of the extruder machine.

As shown in FIG. 3, the three-lobed elements 24 of each screw 11 and 12 are offset relative to one another and are also offset from one screw to the other so as to engage in one another and thus perform intense mixing and kneading of the milk protein powder together with the water and the alkaline reagent.

Because of this intense kneading, the temperature of the mixture rises thus enabling the chemical reaction between the milk proteins and the alkaline reagent to begin.

By way of example, the milk protein powder is introduced into the extruder machine 10 at ambient temperature of about 20° C., and on leaving the kneading zone C, the mixture is at a temperature of about 80° C.

At the outlet from the first kneading zone C, the mixture is transferred into a zone D in which the screws 11 and 12 are provided with large pitch threads 25 leading to a second kneading zone E in which kneading is performed under intense shear and pressure.

Figure 4:
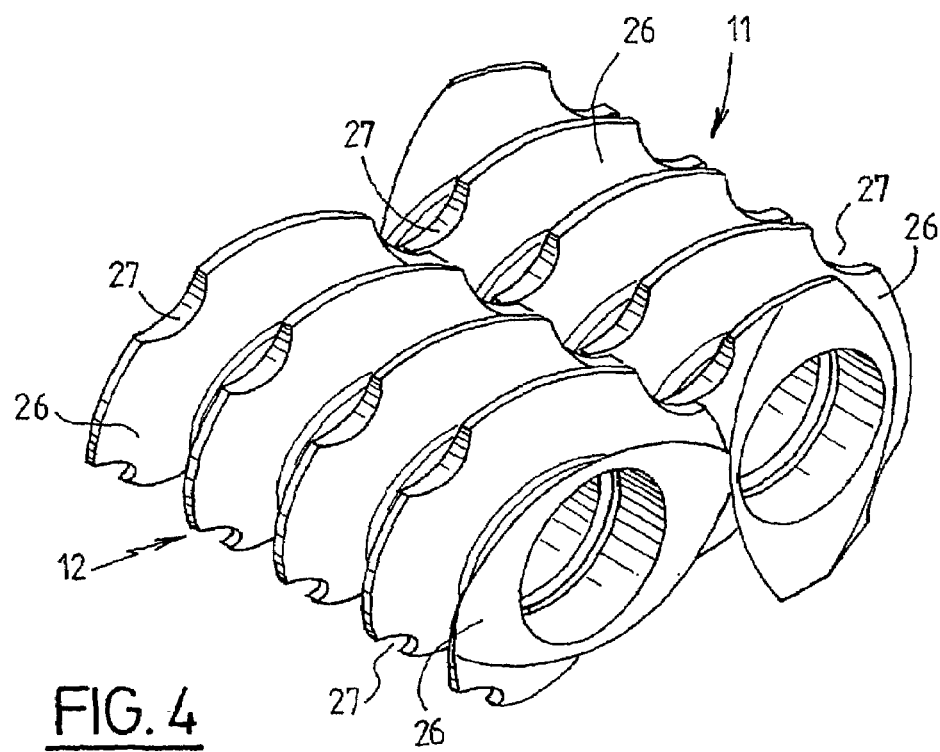
FIG. 4 is a diagrammatic perspective view of a segment of the screw of the extruder machine in the second kneading zone.

As shown in FIG. 4, the screws 11 and 12 in the zone E are constituted by threads 26 of reverse pitch with peripheral edges provided with openings 27 that are regularly distributed around the axis of the corresponding screw.

The openings 27 in each of the threads 26 are offset relative to the openings in the adjacent threads.

The openings 27 in the threads 26 control the rate at which the mixture flows downstream, thereby determining a level of braking in this zone E and a compression force upstream therefrom.

This leads to a high level of shear which homogenizes the mixture and finishes off the chemical reaction with an increase in the temperature of the mixture so as to cause it to melt and obtain a viscous paste of caseinate.

The mixing and shear operation in zone E causes the mixture to heat up, with a large fraction of the mechanical work being converted into thermal energy.

By way of example, the temperature of the mixture on leaving the zone E is about 90° C.

Following the second kneading and shear zone E, the screws 11 and 12 of the extruder machine define a transport and cooling zone F for the caseinate paste.

In this zone F, the screws 11 and 12 are formed of a plurality of segments of different pitches, a first segment F1 having threads 28 at a tight pitch, a second segment F2 having threads 29 at a large pitch, a third segment F3 having threads 30 at a tight pitch, and a fourth segment F4 having threads 31 at a large pitch.

At the beginning of the zone F, the sheath 13 of the extruder machine 10 has a degassing orifice 32 which opens out into the intersecting bores of said sheath 13.

After the caseinate paste has passed through the zone E where it is subjected to intense kneading under pressure and shear, the caseinate paste is subjected in segments F1 and F2 of the zone F to decompression such that the gas contained in said paste escapes via the orifice 32.

While it is being transferred along the zone F, the caseinate paste is cooled so as to keep it at a temperature lying in the range 80° C. to 95° C., which also serves to adjust its viscosity.

On leaving the transport zone F, the caseinate paste passes through a third kneading zone G in which it is kneaded and exchanges heat with cooling being provided to keep its temperature below 95° C.

Figure 5:
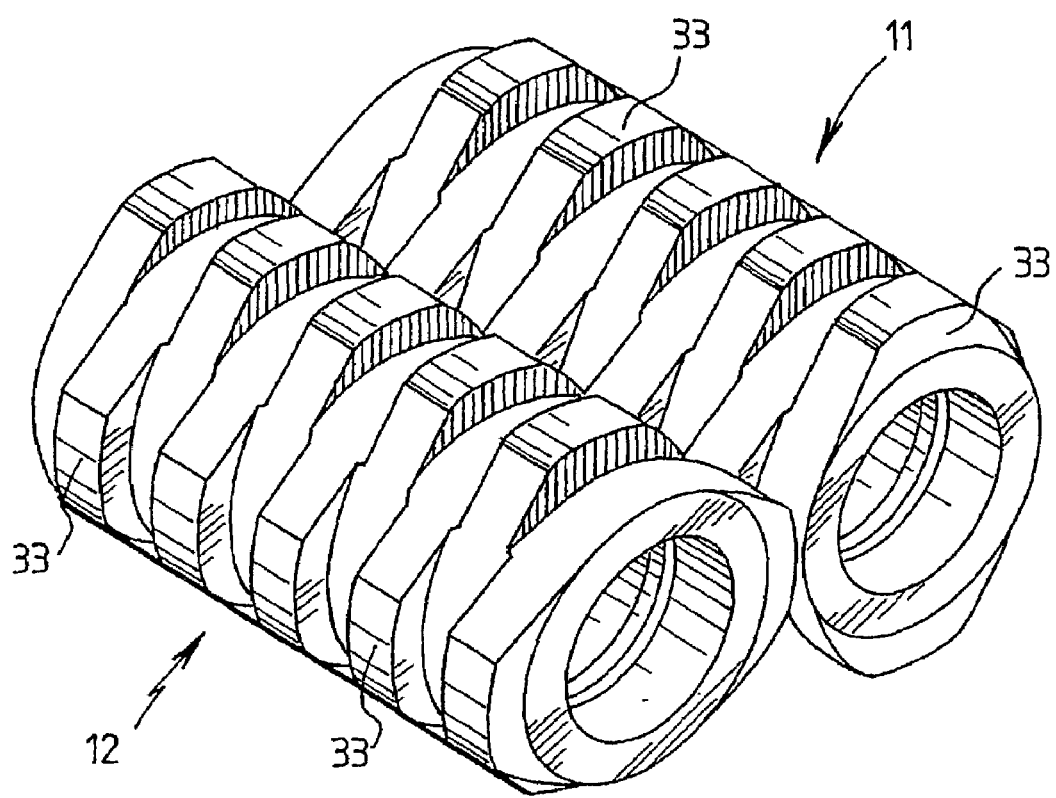
FIG. 5 is a diagrammatic perspective view of a segment of the screw in the third kneading zone.

As shown in FIG. 5, the screws 11 and 12 are constituted in the zone G by two-lobed elements 33 in the form of lozenges with truncated and rounded vertices so as to cause the caseinate paste to pass in controlled manner between said two-lobed elements 33 and the inside wall of the sheath 13.

The two-lobed elements 33 on any one screw are offset at 90° from one another and they are also offset at 90° between the two screws so that they engage in one another.

The caseinate paste is then transferred via a transport and heat exchange zone H to the outlet from the extruder machine 10.

In the zone H, the screws 11 and 12 are provided with threads 34 at a tight pitch.

As it passes through the zones G and H, the caseinate paste is cooled so as to be maintained at a temperature lying in the range 70° C. to 95° C.

By way of example, the caseinate paste is cooled as it is transferred along the extruder machine 10 by means of a circuit formed in the wall of the sheath 13 and in which a cooling fluid circulates.

While milk protein is being processed in the extruder machine 10 to obtain caseinate paste, it is necessary for the temperature of the material to be controlled to ensure that it does not exceed 95° C. since at higher temperatures the chemical reaction does not take place under good conditions and spots of burning can appear in the caseinate paste.

In addition, in order to facilitate processing of the caseinate paste after it has passed through the extruder machine, it is preferable for the temperature of the caseinate paste at the outlet of the machine to be controlled.

The extruder machine 10 is fitted at its downstream end in the material flow direction with an extrusion zone I formed by a die 35 so that the caseinate paste leaves said extruder machine in the form of a continuous strand 40.

On leaving the die 35 the caseinate paste is at a temperature lying in the range 70° C. to 95° C., and its moisture content lies in the range 30% to 40%.

By way of example, the extruder machine 10 presents the configuration given in the following table:

| Zones | A | B1 | B2 | C | D | E | F1 | F2 | F3 | F4 | G | H |
|---|---|---|---|---|---|---|---|---|---|---|---|---|
| Length of screws | 150 | 150 | 50 | DM | 200 | CF | 50 | 200 | 50 | 200 | DM | 525 |
| Screw pitch | 100 | 100 | 50 | | 100 | | 50 | 100 | 50 | 100 | | 50 |

The strand 40 of caseinate paste leaving the extruder machine 10 is transformed in the forming means 50 into a continuous thin sheet 41 derived from said strand 40. These means 50 also cool the caseinate paste to a temperature of less than 20° C.

As shown in FIG. 6, the means 50 comprise two parallel rollers referenced 51 and 52 each provided with a circuit for circulating cooling fluid and leaving between them a gap 53 through which the caseinate paste flows. The means 50 also comprise an endless transporter belt 54 placed beneath one of the rollers, and in the embodiment shown in FIG. 6, placed beneath the roller 52.

The transporter belt 54 covers substantially half the outside surface of the roller 52, and said transporter belt 54 with said roller 52 leaves between them a passage through which the caseinate paste flows so as to form the sheet 41.

In the embodiment shown, the roller 51 is smaller in diameter than the roller 52 and the axis of the roller 51 is placed higher than the axis of the roller 52, so that while the caseinate paste flows it comes into contact with substantially two-thirds of the outside surface of the roller, thereby enabling its temperature to be brought progressively to below 20° C., thereby making it easier to cut up subsequently.

FIG. 7 is a diagram showing one possible embodiment of the cooling circuit for the roller 52, the cooling circuit of the roller 53 being identical.

As shown in this figure, the cooling circuit is constituted by peripheral channels 55 extending parallel to the axis of the roller and connected via respective radial channels 56a and 56b to an inlet channel 57 on the axis of the roller 52, and to an outlet channel 58 for said fluid likewise disposed on the axis of the roller 52 concentrically about said inlet channel 57.

In the embodiment shown in FIG. 7, the radial channels 56a are disposed substantially in the middle of the roller 52 so that the cooling fluid entering via one end of the inlet channel 57 passes to both ends of the peripheral channels 55 and this cooling fluid is removed from each end of the roller 52.

The rollers 51 and 52 have a non-stick coating made up of a layer that is hard and slightly rough, for example a layer of ceramic, or carbide, of a metal or an alloy, and coated in a non-stick polymer, for example a fluorine-containing polymer.

After passing between the roller 52 and the endless transporter belt 54, the sheet of caseinate 41 is of constant thickness lying in the range 2 millimeters (mm) to 3 mm.

The sheet 41 is transferred by a transporter belt 55 to the cutting-up means 80.

Figure 8:
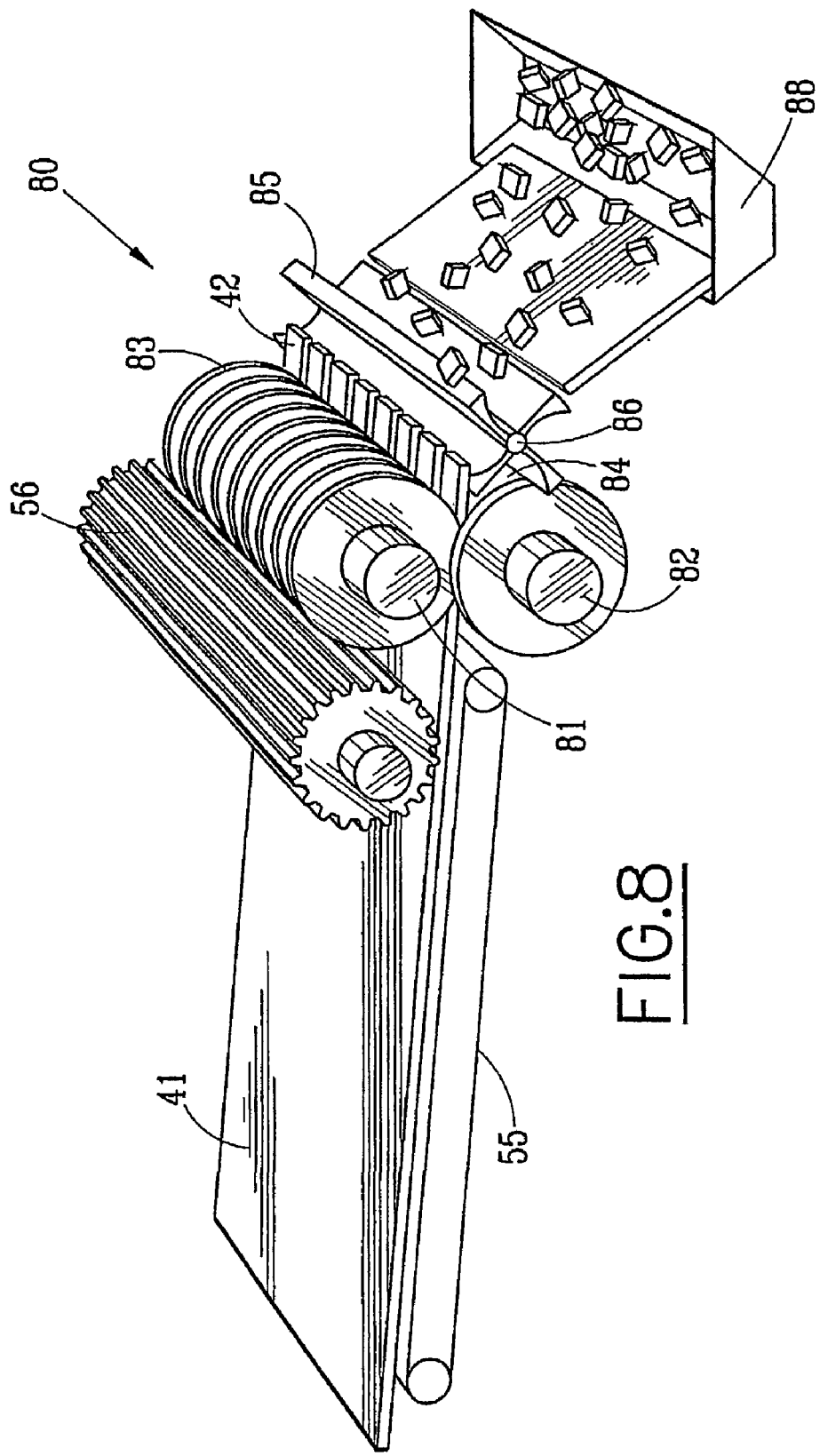
FIG. 8 is a diagrammatic perspective view of the means for cutting up the caseinate paste.

As shown in FIG. 8, the sheet 41 of caseinate paste is transferred into the cutting-up means 80 by means of the transporter belt 55 and a drive roller 56 placed above said transporter belt 55 and having on its outer surface ridges that enable said sheet 41 to be driven in translation.

The sheet 41 is cut into parallel strips by means of two parallel rollers respectively referenced 81 and 82 extending perpendicularly to the travel direction of the sheet 41.

In the embodiment shown in FIG. 8, the top roller 81 has circular cutting blades 83 that are parallel to one another.

The bottom roller 82 has slots 84 in register with the circular blades 83 so that as the sheet 41 passes between the two rollers 81 and 82, the circular blades 83 penetrate into the slots 84, thereby cutting up the sheet 41 longitudinally into strips 42 of caseinate paste extending parallel to one another.

Thereafter, the strips 42 of caseinate paste are cut up into pieces of small dimensions by means of a cutting blade 85 extending perpendicular to the travel direction of the strips 42 and rotated by a horizontal shaft 86.

As shown in FIG. 6, during rotation of the cutting blades 85, the strips 42 of caseinate paste are pressed against a deflector 87, thereby enabling said strips to be held so as to enable the cutting blades 85 to cut said strips into pieces.

The pieces as cut up in this way are recovered in a receptacle 88.

The method and the installation of the invention enable milk proteins to be transformed into caseinate paste by chemical reaction, and it also serves to cool and roll the product of the chemical reaction and to cut up said product into pieces which present excellent solubility and a high degree of chemical neutrality.

The invention claimed is:

1. A method of continuously preparing caseinate, wherein:
    milk proteins in non-soluble powder form are introduced continuously into an extruder machine having two co-rotating and interpenetrating screws rotated about parallel axes inside a sheath of elongate shape;
    a first transport step is performed in the sheath of the extruder machine in which the milk protein powder is transported with water, and an alkaline reagent is introduced into the sheath at the end of this first step;
    the mixture constituted by the milk proteins, the water, and the alkaline reagent is subjected to first intense kneading under pressure with a rise in temperature to initiate the chemical reaction between the milk proteins and the alkaline reagent;

a second transport step is performed in the sheath during which the mixture is transformed while the chemical reaction continues and the temperature of the mixture rises;

the mixture is subjected to second intense kneading under pressure and to intense shear in order to finish off the chemical reaction with the temperature of the mixture rising so as to cause the mixture to melt and so as to obtain a viscous caseinate paste;

a third transport step is performed in which the caseinate paste is transported and cooled with a degassing operation being performed at the beginning of this step to reduce and adjust the temperature and the viscosity of the caseinate paste;

the caseinate paste is subjected to a final kneading and to heat exchange with said paste being cooled;

a fourth transport step is performed together with cooling heat exchange to maintain the caseinate paste at a temperature lying in the range 70° C. to 95° C.;

the caseinate paste is extruded at said temperature with a moisture content lying in the range 30% to 40% to form a continuous strand of caseinate paste at the outlet from the extruder machine;

a continuous thin sheet of caseinate paste is formed from the strand and said sheet of caseinate is simultaneously cooled to a temperature below 20° C.;

the sheet is cut longitudinally into a plurality of parallel strips; and the strips are cut up into small-sized pieces of caseinate.

2. A method according to claim 1, wherein lime or sodium hydroxide is used as the alkaline reagent.

3. A method according to claim 1, wherein the percentage of water plus caseinate relative to the alkaline reagent lies in the range 90% to 97%.

* * * * *